(12) United States Patent
Bappe et al.

(10) Patent No.: US 7,770,053 B1
(45) Date of Patent: Aug. 3, 2010

(54) SYSTEMS AND METHODS FOR MAINTAINING DATA INTEGRITY DURING A MIGRATION

(75) Inventors: Micheal E. Bappe, Loveland, CO (US); Helen S. Raizen, Jamaica Plain, MA (US); Edward L. Thigpen, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 389 days.

(21) Appl. No.: 11/607,067

(22) Filed: Dec. 1, 2006

(51) Int. Cl.
*G06F 11/00* (2006.01)
(52) U.S. Cl. ........................................... 714/3
(58) Field of Classification Search ............ 714/3
See application file for complete search history.

(56) References Cited

U.S. PATENT DOCUMENTS

| | | | |
|---|---|---|---|
| 5,742,792 A * | 4/1998 | Yanai et al. | 711/162 |
| 6,564,336 B1 * | 5/2003 | Majkowski | 714/4 |
| 7,076,690 B1 * | 7/2006 | Todd et al. | 714/13 |
| 7,080,221 B1 | 7/2006 | Todd et al. | |
| 7,080,225 B1 | 7/2006 | Todd | |
| 7,093,088 B1 | 8/2006 | Todd et al. | |
| 2003/0226059 A1 * | 12/2003 | Braun | 714/20 |
| 2004/0080558 A1 * | 4/2004 | Blumenau et al. | 347/19 |
| 2004/0236931 A1 * | 11/2004 | Roth et al. | 713/1 |

OTHER PUBLICATIONS

U.S. Appl. No. 10/211,469.*
U.S. Appl. No. 10/351,791.
U.S. Appl. No. 10/353,322.
U.S. Appl. No. 11/536,995.
File downloaded from PAIR for U.S. Appl. No. 11/536,995, Helen S. Raizen, et al., filed Sep. 29, 2006, file downloaded through Feb. 25, 2009, 174 pages.
File downloaded from PAIR for U.S. Appl. No. 11/863,745, Bradford B. Glade, et al., filed Sep. 29, 2007, file downloaded through Feb. 25, 2009, 244 pages.

* cited by examiner

*Primary Examiner*—Scott T Baderman
*Assistant Examiner*—Yair Leibovich
(74) *Attorney, Agent, or Firm*—Daly, Crowley, Mofford & Durkee, LLP

(57) ABSTRACT

Systems and methods are provided for maintaining data integrity in the event of device write failures during a non-disruptive migration. In one embodiment, a computer-implemented method is provided. According to the method, a filter driver in a kernel may clone an application write to both a source storage device and a target storage device. The method may detect whether the cloned application write to the source storage device or the cloned application write to target storage device failed. When the cloned application write to the source storage device or the cloned application write to target storage device failed, the method may allow application reads from only one of the source storage device and the target storage device thereafter.

11 Claims, 8 Drawing Sheets

SYSTEMS AND METHODS FOR MAINTAINING DATA INTEGRITY DURING A MIGRATION

BACKGROUND

I. Technical Field

The present invention generally relates to the field of data migration.

II. Background Information

Many computer systems include one or more host computers, and one or more storage systems that store data used by the host computers. The storage systems typically include a plurality of disk drives and a plurality of disk controllers that respectively control access to the disk drives. A plurality of storage bus directors control communication with a host computer over communication buses. Each storage system further includes a cache to provide improved storage system performance. In particular, when the host computer executes a read from one of the storage systems, the storage system may service the read from its cache (when the data is stored in the cache) rather than from one of the disk drives, to execute the read more efficiently. Similarly, when the host computer executes a write to one of the storage systems, corresponding storage bus directors can execute the write to the cache. Thereafter, the data can be de-staged asynchronously in a manner that is transparent to the host computer to the appropriate one of the disk drives. Finally, storage systems include internal buses over which storage bus directors, disk controllers, and caches communicate.

The host computer may include a processor and one or more host bus adapters that each controls communication between the processor and one of the storage systems via a corresponding one of the communication buses. It should be appreciated that rather than a single processor, a host computer can include multiple processors. Each bus can be any of a number of different types of communication links, with the host bus adapter and storage bus directors being adapted to communicate using an appropriate protocol via the communication buses coupled there between. For example, each of the communication buses may be implemented as a SCSI bus with the storage bus directors and adapters each being a SCSI driver. Alternatively, communication between the host computer and the storage systems may be performed over a Fibre Channel fabric.

Typically, the storage systems make storage resources available to the host computer for assignment to entities therein, such as a file system, a database manager, or a logical volume manager. If the storage systems are so-called "dumb" storage systems, the storage resources that are made available to the host computer will correspond in a one-to-one relationship to physical storage devices within the storage systems. However, when the storage systems are intelligent storage systems, they will present logical units of storage to the host computer that need not necessarily correspond in a one-to-one relationship to any physical storage devices within the storage system. Instead, the intelligent storage systems may map each logical unit of storage presented to the host across one or more physical storage devices.

Administrators of computer systems may want to migrate sets of logically related data, such as a database or file system, from one storage resource to another. One common reason for doing so is that data stored on a logical unit might grow at such a rate that it will soon exceed the capacity of a storage system. Other common reasons include an administrator's desire to move the data to a storage system with faster response time, to organize the data differently on the resource to facilitate faster access, to reconfigure disk striping for fault tolerance and/or performance purposes, or to optimize the location where the data is physically stored.

Data migrations are often complicated and problematic exercises. Administrators usually must take offline any applications executing on the host that use a source device. Depending on the size of the data, applications can be offline for lengthy periods, leading to a loss of productivity, and opportunity costs associated with not having the data available for important business functions. Migrations typically are manual efforts, and are therefore error-prone, costly, and labor-intensive.

Conventional data migration efforts typically involve the following four separate steps, requiring manual intervention between each: source discovery, target provisioning, data synchronization (i.e., movement), and reconfiguration to switch to target access.

The source discovery step identifies the physical locations (e.g., the storage system and logical unit) at which the data is stored. This step is typically performed manually. An exemplary conventional method includes the use of spreadsheets to compile an inventory of file systems, database table spaces, and other data stored on individual storage volumes.

The target provisioning step identifies and configures the storage resources (typically logical units of storage presented by another storage system) to which the data will be moved. Conventionally, this step requires extensive manual intervention by, for example, database administrators and system administrators. This step may include making new logical units visible to one or more host computers, mapping file systems and/or table spaces on target logical units, configuring switches, configuring volumes for redundancy, and planning for more efficient physical data access. This step is typically very time-consuming and labor-intensive and, thus, expensive.

The synchronization step involves moving or copying the data from the source locations to the target locations. Various techniques have been used to perform this step, including employing a utility application running on one or more host computers to read the data from the source locations and write the data to the target locations. Alternatively, a mirroring facility, such as the SYMMETRIX Remote Data Facility (SRDF) available from EMC Corporation, Hopkinton, Mass., may be used to create mirrors between source and target volumes on different storage systems and to then synchronize them so that the storage systems themselves perform the copy. Other data copy tools available from EMC include OPEN REPLICATOR for SYMMETRIX data storage systems and SANCOPY for CLARIION data storage systems. Synchronization is often the most time consuming of the four steps and usually requires taking the applications that are accessing the data offline (i.e., refused access to the data) while the step is performed.

After the data has been moved or copied, the switch to target step typically involves reconfiguring the computer system so that applications using the data will recognize the target locations as the new storage location for the data. Again, this conventionally requires human intervention and may require rebooting of the host computer(s) that access the data.

EMC Corp. has recognized the desirability of being able to migrate data non-disruptively. U.S. Pat. No. 7,093,088, which is hereby incorporated by reference, for example, discloses methods and systems that enable less disruptive migration. The inventors of the present invention, however, recognized that conventional migration techniques do not allow an application to run during a migration. For example, conventional migration techniques prevent user applications from modifying data during a migration in order to prevent data corruption, data loss, or other data integrity issues that might occur. Therefore, the inventors recognized that the use of conventional techniques are limited and suffer from one or more drawbacks. In view of the foregoing, there is a need for improved systems and methods for maintaining data integrity during a migration.

SUMMARY

Consistent with an embodiment of the present invention, a computer-implemented method is provided for maintaining integrity of application data in the event of device write failures during a non-disruptive migration. According to the method, a filter driver in a kernel may clone an application write to both a source storage device and a target storage device. The method may detect whether the cloned application write to the source storage device or the cloned application write to target storage device failed. When the cloned application write to the source storage device or the cloned application write to target storage device failed, the method may allow application reads from only one of the source storage device and the target storage device thereafter.

Consistent with another embodiment of the present invention, a computer-implemented method is provided for maintaining integrity of application data in the event of a host restart during a non-disruptive migration and while preserving an existing state of the migration when there has not been a host crash. According to the method, a filter driver in a kernel may clone an application write to both a source storage device and a target storage device. The method may suspend or return an error for the application write while a flag indicates data on both the source storage device and the target storage device is the same. Before enabling application writes, the method may set the flag to indicate the data is not the same on both the source storage device and the target storage device. After disabling application writes and waiting for outstanding device writes to complete successfully, the method may set the flag to indicate the data is the same on both the source storage device and the target storage device.

Consistent with yet another embodiment of the present invention, a computer-implemented method is provided for maintaining data integrity during a non-disruptive migration after a host boot. When a prior shutdown of the host was not a clean shutdown, write cloning is in use, and a fault is not recorded, the method may fault a non-selected side of the migration, record a fault for the non-selected side in user metadata, disable write cloning, and record the fault in kernel memory. When the prior shutdown of the host was a clean shutdown, the method may disable writes until a clean shutdown state is reset.

Consistent with still yet another embodiment of the present invention, a computer-implemented method is provided for performing a clean shutdown to maintain data integrity during a non-disruptive migration. The method may comprise disabling writes to a source storage device and a target storage device and waiting for outstanding device writes to complete. When a fault is recorded in user metadata, the method may perform a transition to change a state of the migration. When the user metadata includes no recorded faults, the method may determine whether a fault is recorded in kernel memory. When there is a determined fault, the method may record the determined fault in user metadata and perform a required transition. Further, the method may set a clean shutdown flag in kernel metadata.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
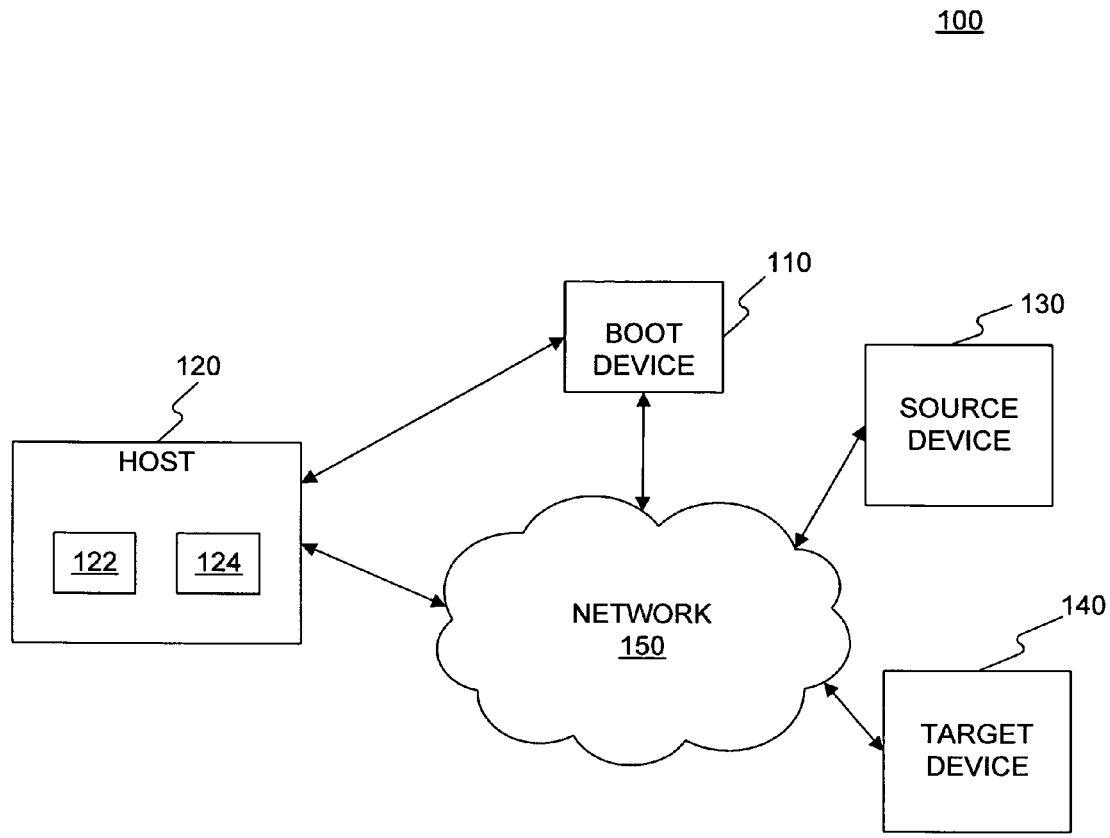
FIG. 1 is an exemplary system for maintaining data integrity during a migration, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the scope of the invention is defined by the appended claims.

The methods and apparatus of the present invention are intended for use in networks that include data storage systems, such as a SYMMETRIX or a CLARIION System. Furthermore, the methods and apparatus of the present invention may take the form, at least partially, of program code (i.e., instructions) embodied in tangible media, such as floppy diskettes, CD-ROMs, hard drives, random access or read only-memory, or any other machine-readable storage medium, including a transmission medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. When implemented on a general-purpose processor, the program code combines with the processor to provide a unique apparatus that operates analogously to specific logic circuits. The program code (software-based logic) for carrying out the method is embodied as part of the system described below.

As used herein, the term "non-disruptive data migration" refers to a process in which data is migrated to a new data storage device without shutting down an application executing on a host that is reading data from, and writing data to, an existing data storage device. Since the migration is non-disruptive, an application executing on a host may continue to read data from a source device and write new data to the source device during the migration. Furthermore, during the migration, the source device and a target device must become synchronized. That is, any new data that is written by the application executing on the host to the source device is also written to the target device. At the completion of the migration, the target device is expected to store all of the data that was stored on the source device, including any data that was written to the source device after initiating the migration.

FIG. 1 is an exemplary system for maintaining data integrity during a migration, consistent with an embodiment of the present invention. FIG. 1 includes host 120, a boot device 110, a network 150, a source device 130, and a target device 140. Network 150 enables communication between host 120, boot device 110, source device 130, and target device 140. Alternatively, or in addition, boot device 110 may communicate directly with host 120. Network 150 may be, for example, a Fibre Channel fabric. Alternatively, network 150 may include, among other components, SCSI buses and SCSI drivers, for example.

Boot device 110 may be a device, such as a boot disk, boot drive, or boot chip, for example, for causing host 120 to execute boot processes (e.g., startup of host 120). As shown in FIG. 1, boot device 110 may communicate directly or indirectly with host 120. Alternatively, boot device 110 may be included in host 120.

Host 120 may be any type device for communicating with boot device 110, source device 130, and target device 140 over network 150. For example, host 120 may be a personal computer, handheld device, server, or any other appropriate computing platform or device capable of exchanging data with boot device 110 and/or network 150. Host 120 may include, for example, a processor 122, a memory 124, and one or more host bus adapters (not shown) to connect to network 150. Furthermore, host 120 may execute software for managing and/or monitoring a migration of data from source device 130 to target device 140. For example, memory 124 may provide functionality for allowing a user to transition between different states of a migration, such as source selected and/or target selected, during a migration. States and state transitions that may occur during migration are discussed below in further detail.

Source device 130 and target device 140 are available to host 120 via network 150. Source device 130 may store data for host 120. Target device 140 may be a target of a migration (i.e., during a migration, data from source device 130 is copied to target device 140). Each of devices 130 and 140 may include one or more disk drives (not shown), parts of one or more disk drives, or any other appropriate storage mechanism. For example, source device 130 may be a logical unit on a SYMMETRIX storage system. Source device 130 and target device 140 may be the same or different kinds of storage devices. Furthermore, devices 130 and 140 may each be presented as a single logical unit.

Host 120 may use source device 130 to store data. Accordingly, data for host 120 stored on source device 130 may be migrated to target device 140. During a migration process, host 120 may store metadata describing the state and/or status of the migration in boot device 110. This metadata may be stored in the boot device 110, for example, as kernel metadata or user metadata. Kernel metadata and user metadata are discussed below in further detail with regard to FIG. 3. Storing kernel and/or user metadata may allow the migration to resume after a crash or a graceful shutdown of host 120. For example, in order to resume a migration smoothly after a crash of host 120, boot device 110 must be the first device host 120 accesses during a host boot process. Accordingly, host 120 may enable a kernel state of the migration process to be restored during a reboot.

One of skill in the art will appreciate that although one host, one boot device, and two storage devices are depicted in FIG. 1, any number of hosts, boot devices, and storage devices may be provided in system 100.

Figure 2:
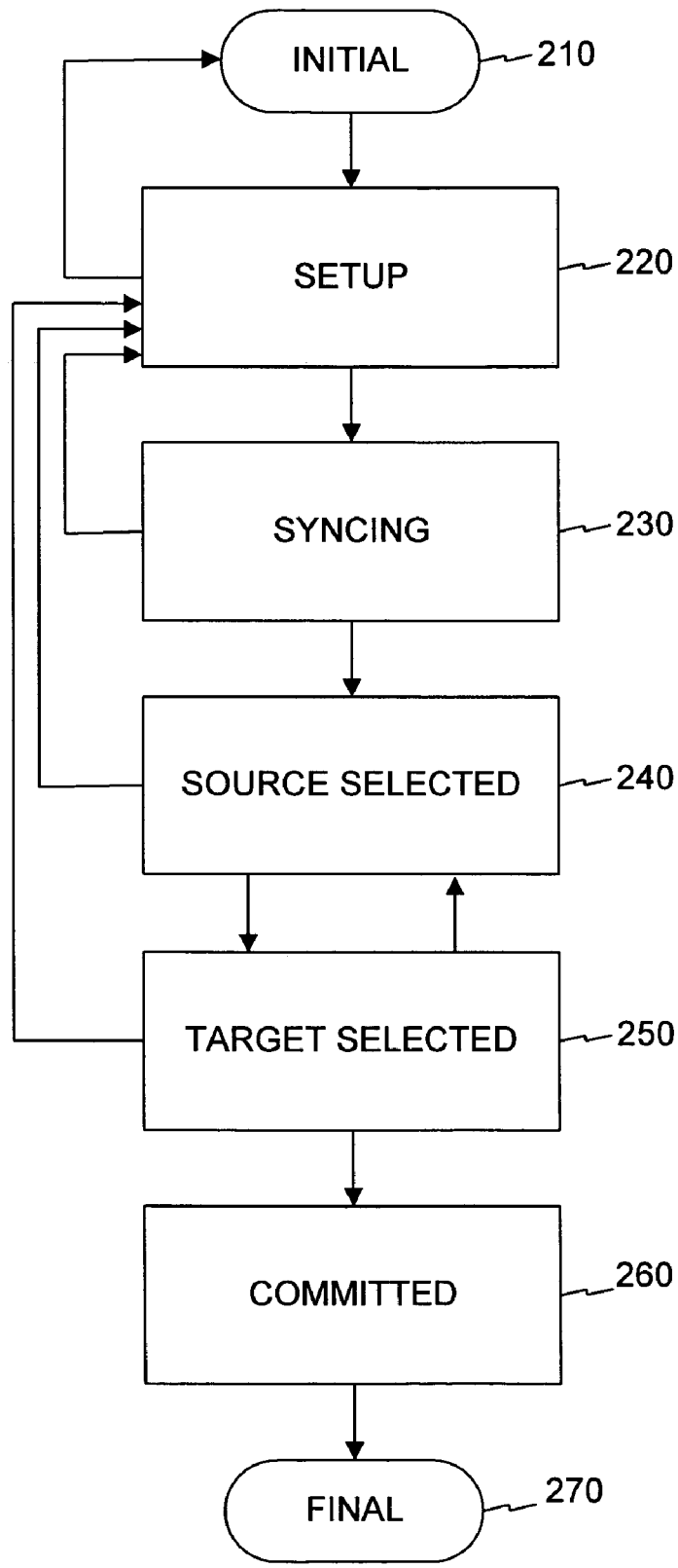
FIG. 2 is a diagram of exemplary states of a migration, consistent with an embodiment of the present invention.

FIG. 2 is a diagram 200 of exemplary states of a migration, consistent with an embodiment of the present invention. During a migration, host 120 may control the migration through transitions between different stages that are referred to as "states." Changing from one state to another state is referred to as a "state transition." As shown in FIG. 2, arrows represent possible state transitions that may occur during a migration.

Initial state 210 occurs prior to any migration operation. Setup state 220 is reached when a setup command, which is initiated by a user, initializes a migration operation. During the transition to setup state 220, all preparation that is required before synchronization of source device 130 and target device 140 is completed, including required validations, and any technology-specific setup steps. Furthermore, setup state 220 may also be reached as a result of aborting a migration. From setup step 220, the user has the choice of continuing to a syncing state 230, or returning to an initial state 210, which eliminates the state changes that were made to reach setup state 220.

Syncing state 230 is reached when a sync command initiates a synchronization of a source device and a target device, such as source device 130 and target device 140. Data from source device 130 is copied to target device 140 and new writes to source device 130 are mirrored to both source device 130 and target device 140. Once source device 130 and target device 140 are synchronized (i.e., both devices store the same data), syncing state 230 automatically transitions to a source selected state 240. However, automatic transition from the syncing to the source selected state does not occur if there is a device write error while syncing, as discussed below in further detail.

In source selected state 240, which is one of two states where the source and target are synchronized but the migration is not yet committed, new writes are mirrored to both source device 130 and target device 140. The migration may return to source selected state 240 when the user issues a command to select source device 130 when the migration is in a target selected state 250.

Target selected state 250 is reached when a select target command is issued by the user. New reads are retrieved from target device 140, while new writes continue to be mirrored to both source device 130 and target device 140. In target selected state 250, source device 130 and target device 140 continue to be kept synchronized, but the user has not committed to the migration.

Committed state 260 is entered when the user issues a commit command while the migration is in the target selected state. A migration operation cannot be aborted from this state. The user may issue the commit command when the user is satisfied with the migration and wishes to transition to target device 140. Upon a successful transition to committed state 260, source device 130 is no longer kept synchronized with target device 140. Instead, the user has decided to permanently switch to target device 140

Final state 270 is reached after a cleanup command. Before allowing access to the source logical unit in a migration process, the cleanup command removes any data or metadata from the source logical unit that might cause OS or application confusion or errors.

As discussed above, various commands may be issued by the user to transition from one state to another. For example, a "sync command" will transition a migration from setup state 220 to syncing state 230. When a system is syncing state 230, upon completion of a copy-sweep of the data from a source device to a target device, the migration will automatically transition to source selected state 240. A "select target command" will transition the migration from source selected state 240 to target selected state 250. A "commit command" will transition the migration from target selected state 250 to committed state 260. Additional commands are available to the user, such as a "select source command." For example, when the system is in target selected state 250, the "select source command" will transition from target selected state 250 to source selected state 240, as represented by an arrow shown in FIG. 2. Furthermore, as shown by arrows in FIG. 2, a transition may be made from any non-setup state excluding committed state 260 (i.e., from syncing state 230, source selected state 240, or target selected state 250) back to setup state 220. Such a transition back to setup state 220 constitutes an abort of the migration.

Figure 3:
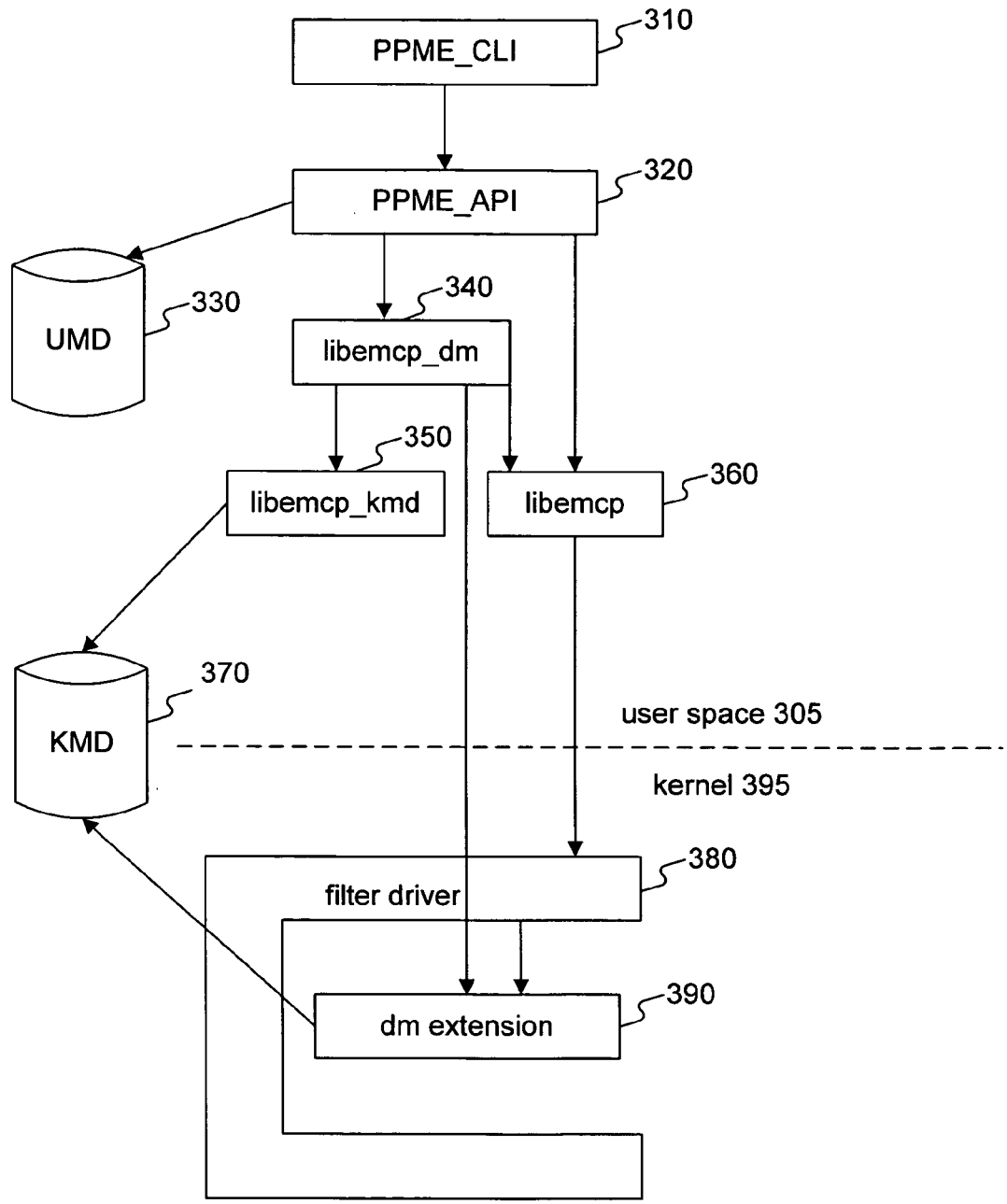
FIG. 3 is an exemplary architecture, consistent with an embodiment of the present invention.

FIG. 3 is an exemplary architecture 300 of a non-disruptive migration enabler, consistent with an embodiment of the present invention. Architecture 300 may be implemented as, for example, part of EMC POWERPATH by EMC Corporation of Hopkinton, Mass. Further, portions of architecture 300 may be stored, for example, in memory 124 of host 120 and/or in boot device 110. Architecture 300 includes PPME_CLI interface 310, PPME_API 320, user metadata (UMD) 330, libemc_dm interface 340, libemcp_kmd 350, libemcp 360, kernel metadata (KMD) 370, filter driver 380, and a data migration (DM) extension 390. An operating system (not shown) may separate available system memory into a kernel 395 and user space 305. As shown in FIG. 3, kernel 395 includes filter driver 380, and DM extension 390. Furthermore, kernel metadata 370 is accessible by kernel 395. User space 305 includes PPME_CLI interface 310, PPME_API 320, user metadata 330, libemc_dm interface 340, libemcp_kmd 350, libemcp 360, and kernel metadata 370.

Kernel 395 may execute filter driver 380 and kernel extensions, such as DM extension 390. User space 305 is external to kernel 395 and may include a set of libraries provided by an operating system for performing input/output or otherwise interacting with kernel 395. Kernel 395 may provide abstraction layers for hardware, memory, processors, and input/output (I/O) and make these tools available to user space 305 through inter-process communication mechanisms and system calls. For example, user space code may recognize that DM extension 390 has recorded a fault prior to allowing a migration transition. Furthermore, when a fault would compromise data integrity on a selected side of a migration, no further input/output may be allowed by DM extension 390 until the selected side of the migration is changed to the side of the migration that did not experience the fault.

As shown in FIG. 3, PPME_CLI interface 310 is a command interface to PPME_API 320. In other implementations, a web-based interface (not shown) may be included in addition to, or in alternative to, PPME_CLI interface 310.

PPME_API 320 represents an implementation of an application program interface (API) that provides a set of routines in libraries for implementing a non-disruptive migration enabler. From a user interface displayed by host 120, the user may initiate a migration, as well issue commands to transition from migration states. For example, the user may issue a command to transition a migration from a target selected state to a source selected state. Furthermore, a user may issue any other command, as discussed above.

Libemcp_kmd 350 is a kernel metadata subsystem that is used to maintain a kernel persistent state across reboots.

Libemcp 360 records changes to support name swapping for migrations involving pseudonames.

Libemcp_dm interface 340 is a user space library interface to DM extension 390.

Metadata records states of active migration sessions and allows for recovery in the event of a system and/or process crash. User metadata 330 stores metadata used and understood by PPME_API 320 and kernel metadata 370 stores metadata needed to restore a state in DM extension 390. User metadata 330 and kernel metadata 370 may be implemented using embedded databases, for example.

User metadata 330 may store a record for every migration source/target pair that is currently active. Each record may include data that is used to track the state of the migration, from setup to cleanup, and may include fields such as when a state change is about to occur, when the migration record is first updated to reflect the state being transitioned to, and the command being used to effect the transition. If the transition is interrupted, the command and state are used to determine what recovery action is needed. Once all transition steps are complete, the record stored in user metadata 330 may be updated to reflect the ending state, and that no command is in progress.

Kernel metadata 370 stores metadata that is read-only for kernel 395. Kernel metadata 370 may be used to restore a kernel state at reboot and/or reload time so that steps in a migration are reliably recovered and so that user data is not compromised. For example, kernel metadata 370 may indicate whether the source or the target is currently the selected side of the migration. Kernel metadata 370 may also store data indicating whether or not the last shutdown of a host was a clean shutdown.

Filter driver 380 may be included in an I/O stack. The POWERPATH tool, available by EMC Corp., is an example of an I/O filter driver. In the exemplary embodiment illustrated in FIG. 3, DM extension 390, included in the POWERPATH tool, extends the functionality of the POWERPATH tool to provide embodiments of the present invention. Filter driver 380, which may interact with an operating system (not shown), may conceptually be considered to be placed between the operating system and at least one host bus adapter (not shown).

DM extension 390 is included in filter driver 380 and manages I/O requests during a data migration process. DM extension 390 may implement functionality for kernel 395 that is needed to support data migration, including I/O redirection, access control, and write cloning. For example, DM extension 390 may handle every write I/O and clone them during syncing state 230, source selected state 240, or target selected state 250. In one situation, a write may be directed by host 120 to target device 140 and may be cloned to source device 130. In another situation, a write may be directed by host 120 to source device 130 and may be cloned to target device 140. Furthermore, although shown as one extension, DM extension 390 may include a plurality of extensions. Additional details concerning an I/O filter driver are disclosed in co-pending U.S. patent application Ser. No. 11/536,995, filed Sep. 29, 2006, which is entitled "Methods And Systems For Managing I/O Requests to Minimize Disruption Required for Data Migration," and which is hereby incorporated by reference.

When DM extension 390 detects a fault, DM extension 390 ceases to perform I/O that could exacerbate the problem and records the fault for handling by PPME_API 320. PPME_API 320 checks the fault state in DM extension 390 prior to any state-changing action. For example, when write cloning is on and one side of a cloned write fails, DM extension 390 records a fault for the failure. If the fault is due to the original write, an error is returned. If the fault is due to the cloned write, success is returned. A fault on the original write will also cause "error returning behavior." That is, error returning behavior causes all I/Os to return errors. Such behavior is required to preserve the integrity of the data on the cloned side of a migration until the user initiates an appropriate state change. The state change will also cause the error returning behavior to be cleared. Once an error is recorded, any subsequent writes are no longer cloned. The error condition is kept until either write cloning is turned off by PPME_API 320 or host 120 is rebooted.

DM extension 390 records and acts upon the first fault it encounters during a migration. Subsequent faults may result in errors being returned, but no other action is taken in DM extension 390. DM extension 390 also implements special behavior after a crash. After a crash, DM extension 390 will engage in error returning behavior for any device for which write cloning is turned on. This behavior may be cleared by PPME_API 320 once recovery processing is complete and all migrations are in a safe state. DM extension 390 may also implement special behavior when rebooting after a clean shutdown, as discussed below.

Further, DM extension 390 includes functionality for detecting device write errors while a migration is in the syncing, source selected, or target selected states. Detection of device write errors is discussed below. Certain transitions may be prevented following detection of a fault. Table 1 provides a summary of exemplary "fault states" that may be detected and recorded by embodiments of the present invention.

TABLE 1

Reported Fault States

| CURRENT STATE | SOURCE FAILURE | TARGET FAILURE | Host Crash | REPORTED FAULT STATE | ERROR RETURN BEHAVIOR |
|---|---|---|---|---|---|
| Setup | X | | | N/A | |
| | | X | | N/A | |
| | | | X | N/A | |
| Syncing | X | | | SourceFault | YES |
| | | X | | TargetFault | |
| | | | X | TargetFault | |
| SourceSelected | X | | | SourceFault | YES |
| | | X | | TargetFault | |
| | | | X | TargetFault | |
| TargetSelected | X | | | Source Fault | |
| | | X | | TargetFault | YES |
| | | | X | SourceFault | |
| Committed | X | | | N/A | |
| | | X | | N/A | |
| | | | X | N/A | |

As shown in Table 1, faults are reported when a source failure, target failure, or host crash occurs. Furthermore, faults are only reported when the current state of a migration is one of syncing, source selected, or target selected and when write cloning is in use. When the current state is the syncing state and the source device experiences a fault, the reported fault is a "source fault." However, when the current state is the syncing state and the target device experiences a fault or the host crashes, then the reported fault is a "target fault." When the current state is the source selected state and the source device experiences a fault, the reported fault is a "source fault." However, when the current state is the source selected state and the target device experiences a fault or the host crashes, then the reported fault is a "target fault." When the current state is the target selected state and the source device experiences a fault or the host crashes, the reported fault is a "source fault." However, when the current state is the target selected state and the target device experiences a fault, then the reported fault is a "target fault."

Table 2 provides a summary of exemplary transitions, which may be allowed during a migration when a particular fault state occurs.

TABLE 2

Allowed Transitions

| CURRENT STATE | FAULT STATE | ALLOWED TRANSITIONS | REPORTED ERRORS |
|---|---|---|---|
| Setup | N/A | No restrictions | Faults are not detected in this state. |
| Syncing | SourceFault | Abort | Errors will be returned on I/Os until this transition is made. |
| | TargetFault | Abort | |
| SourceSelected | SourceFault | SelectTarget | Errors will be returned on I/Os until this transition is made. |
| | TargetFault | Abort | |
| TargetSelected | SourceFault | Commit | |
| | TargetFault | Abort | Errors will be returned on I/Os until this transition is made. |
| Committed | SourceFault | cleanup (No restrictions) | New faults not detected in this state, but could be in this state from fault that occurred while in TargetSelected state. |
| | TargetFault | N/A | New faults are not detected in this state and this state combination is not possible. |

As shown in Table 2, certain transitions are allowed depending upon a recorded fault state and a current state of the migration. Furthermore, these restrictions on state transitions are imposed only when the current state is one of syncing, source selected, or target selected. By contrast, any one of the transitions shown in FIG. 2 may occur when there are no faults.

When the current state is the syncing state and the recorded fault state is a "source fault" or a "target fault," then the only allowed transition is an abort command, which will return the migration to the setup state. When the current state is the source selected state and the recorded fault state is a "source fault," then the only allowed transition is to the target selected state. When the current state is the target selected state and the recorded fault state is a "source fault," then the only allowed transition to the committed state. When the current state is the target selected state and the recorded fault state is a "target fault," then the only allowed transition is an abort command, which will return the migration to the setup state.

Figure 4:
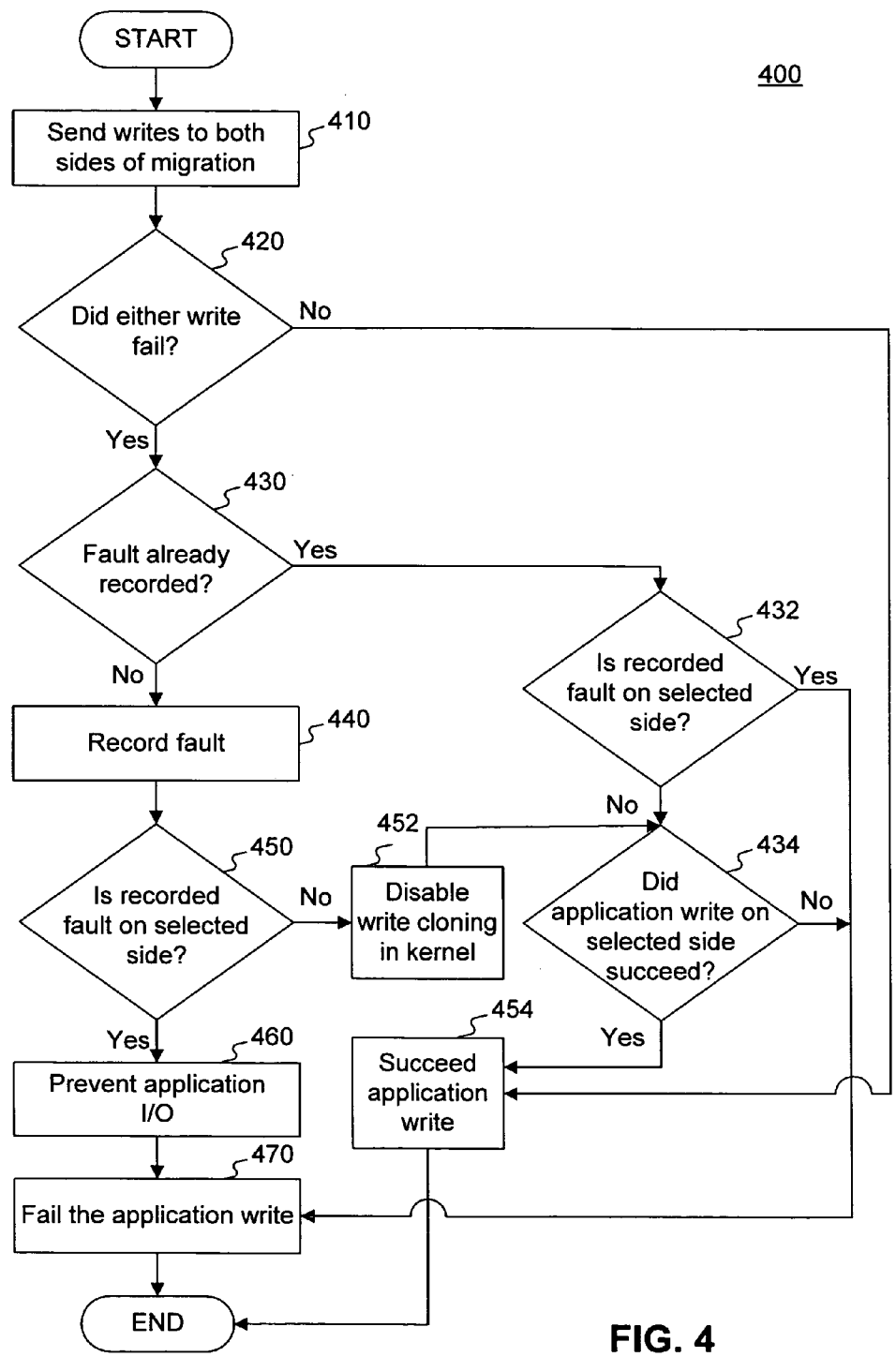
FIG. 4 is a flow diagram of an exemplary method for handling application write errors in the kernel, consistent with an embodiment of the present invention.

FIG. 4 is a flow diagram of an exemplary method 400 for handling device write errors in kernel 395, consistent with an embodiment of the present invention. In step 410, during a migration, writes are sent to both sides of the migration. That is, a write from host 120 to source device 130 is transmitted to both source device 130 and target device 140. Next, in step 420, DM extension 390 determines whether either of the writes have failed. If a write to source device 130 or target device 140 has failed, then the process proceeds to step 430. If neither write failed, then the process proceeds to step 454. In step 454, the application write is succeeded and the process ends.

In step 430, when it has been determined that a write to one of devices 130 and 140 has failed, DM extension 390 determines whether a fault has already been recorded in runtime data structures of DM extension 390. If a fault has already been recorded, then the process proceeds to step 432. If a fault has not already been recorded, then the process proceeds to step 440.

In step 432, when a fault has already been recorded, DM extension 390 determines whether the recorded fault is on the selected side of the migration. If the recorded fault is for the selected side of the migration, then the process proceeds to step 470. In step 470, the application write is failed and the process ends.

However, in step 432, when the recorded fault is not on the selected side of the migration, then the process proceeds to step 434. In step 434, DM extension 390 determines whether the application write on the selected side of the migration succeeded. If the application write on the selected side of the migration succeeded, then the process proceeds to step 454. In step 454, the application write is succeeded and the process ends. However, if the application write on the selected side of the migration did not succeed, then the process proceeds to step 470. In step 470, the application write is failed and the process ends.

In step 440, if a fault was not already recorded in step 430, then the fault is recorded in kernel 395 by DM extension 390. The process proceeds to step 450.

In step 450, DM extension 390 determines whether the recorded fault is on the selected side of the migration. If the recorded fault is not on the selected side of the migration, then the process proceeds to step 452. In step 452, write cloning is disabled in kernel 395 by DM extension 390, and the process proceeds to step 434, discussed above. If the recorded fault is not on the selected side of the migration, then the process proceeds to step 460

In step 460, application I/O is prevented and the process proceeds to step 470. In step 470, the application write is failed, and the process ends. Furthermore, application I/O will be prevented until the required transition, as indicated in Table 2, is performed by a user.

Figure 5:
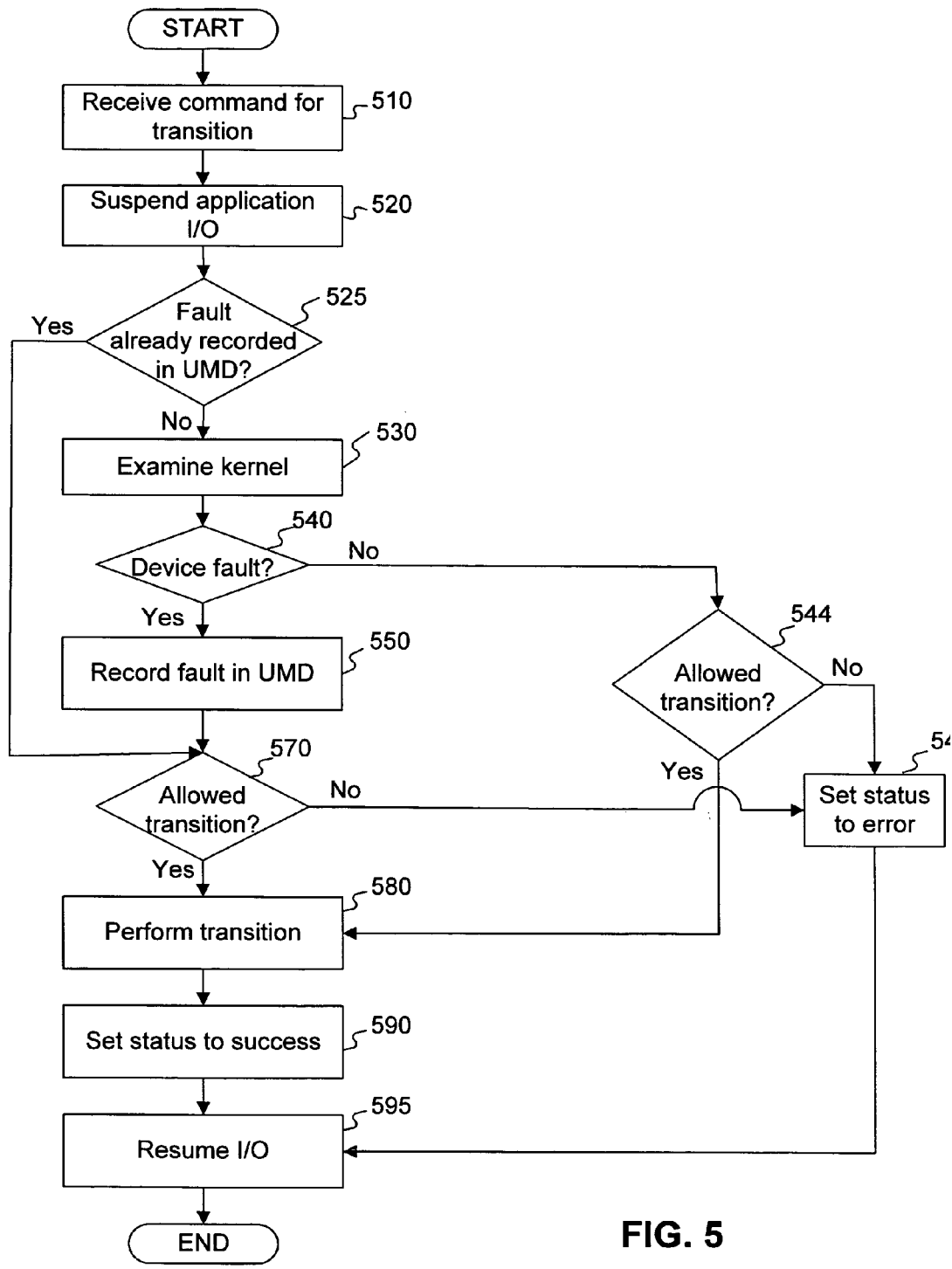
FIG. 5 is a flow diagram of an exemplary method for handling state transitions in user space, consistent with an embodiment of the present invention.

FIG. 5 is a flow diagram of an exemplary method 500 for handling state transitions in user space 305, consistent with an embodiment of the present invention. Certain faults may indicate a loss of synchronization of source device 130 and target device 140. Accordingly, some state transitions shown in FIG. 2 are prevented after the detection of these faults. By preventing state transitions, the user may be required to return to a setup state in order to restart a migration due to a fault or the user may be forced to commit to the migration.

In step 510 of method 500, PPME_API 320 may receive a command for a state transition. For example, the command may be initiated by host 120 at the direction of a user or may occur automatically in certain instances. The command may indicate a transition from any one of the states previously discussed in connection with FIG. 2, such as from a setup state to a syncing state, the syncing state to a source selected state, the source selected state to a target selected state, and the target selected state to a committed state, for example. The process proceeds to step 520.

In step 520, application I/O is suspended by host 120. That is, any new I/Os from the application are held temporarily until application I/O is resumed. Any I/Os that are already in progress are allowed to complete before proceeding to step 525.

In step 525, PPME_API 320 determines whether a fault is already recorded in user metadata 330. If a fault is already recorded, then the process proceeds to step 570, discussed below. However, if a fault is not recorded, then the process proceeds to step 530.

In step 530, a kernel state stored by DM extension 390 is examined prior to making the transition and the process proceeds to step 540.

In step 540, PPME_API 320 determines whether the kernel state examined in step 530 indicates that a fault has occurred for source device 130 or target device 140. If a device fault has not been detected, then the process proceeds to step 544. However, if a device fault has been detected, then the process proceeds to step 550, discussed below.

When a device fault has not been detected, in step 544, allowable transitions are determined based on a current state of the migration and the commanded state specified in step 510. If the commanded state is allowed based on FIG. 2, then the process proceeds to step 580. If the commanded state is not allowed, then the process proceeds to step 546. In step 546, the status is set to an error and the process goes to step 595. In step 595, I/O is resumed and the process ends.

In step 550, when a device fault was detected in step 540, the fault is recorded in user metadata 330. Next, the process proceeds to step 570, in which allowable transitions are determined based on a current state of the migration, the commanded state specified in step 510, and the device fault state. If the commanded transition is allowed based on Table 2, then the process proceeds to step 580. If the commanded transition is not allowed, then the process proceeds to step 546. In step 546, the status is set to an error and the process proceeds to step 595. In step 595, I/O is resumed and the process ends.

In step 580, when the commanded transition is allowed, the commanded transition is performed. Next, in step 590, the status is set to success and the process proceeds to step 595. In step 595, I/O is resumed and the process ends.

Figure 6:
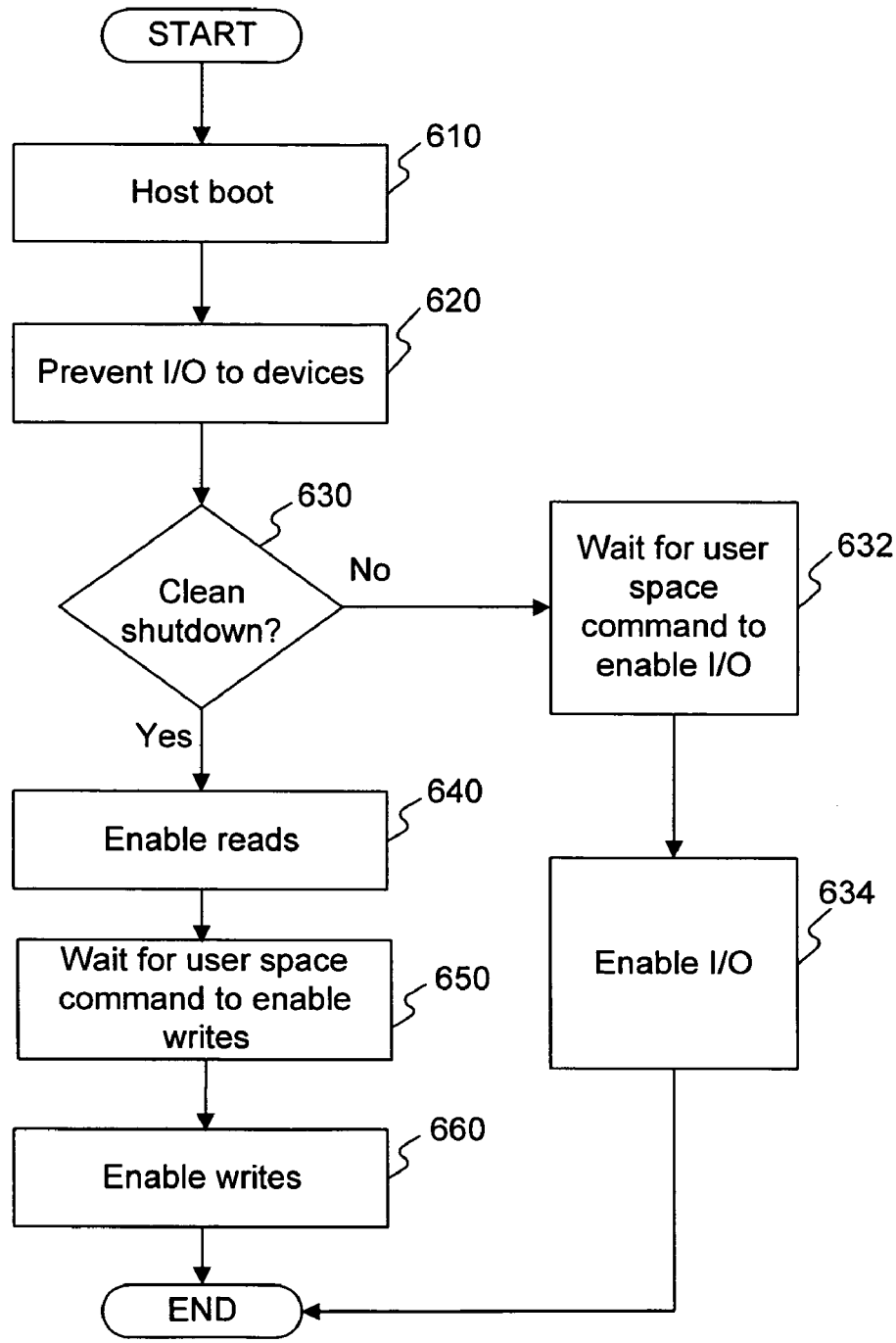
FIG. 6 is a flow diagram of an exemplary method in the kernel for maintaining data integrity after a host boot, consistent with an embodiment of the present invention.

FIG. 6 is a flow diagram of an exemplary method 600 in kernel 395 for maintaining data integrity after a host boot, consistent with an embodiment of the present invention. In step 610, host 120 boots, which may occur at the direction of boot device 110. Next, in step 620, I/O is prevented to source device 130 and target device 140. In step 630, DM extension 390 determines whether the prior shutdown of host 120 was a clean shutdown by examining kernel metadata 370. If the prior shutdown was a clean shutdown, then the process proceeds to step 640. If the prior shutdown was not a clean shutdown, then the process proceeds to step 632. In step 632, DM extension 390 waits for a command from user space 305 (e.g., from PPME_API 320) to enable I/O. In step 634, I/O is enabled when PPME_API 320 issues an appropriate command. Once the command has been issued, I/O proceeds and the process ends.

In step 640, when the prior shutdown was a clean shutdown, reads are enabled by DM extension 390. In step 650, DM extension 390 waits for a command from user space 305 (e.g., from PPME_API 320) to enable writes. In step 660, writes are enable when PPME_API 320 issues an appropriate command. Once the command has been issued, writes are enabled and the process ends.

Figure 7:
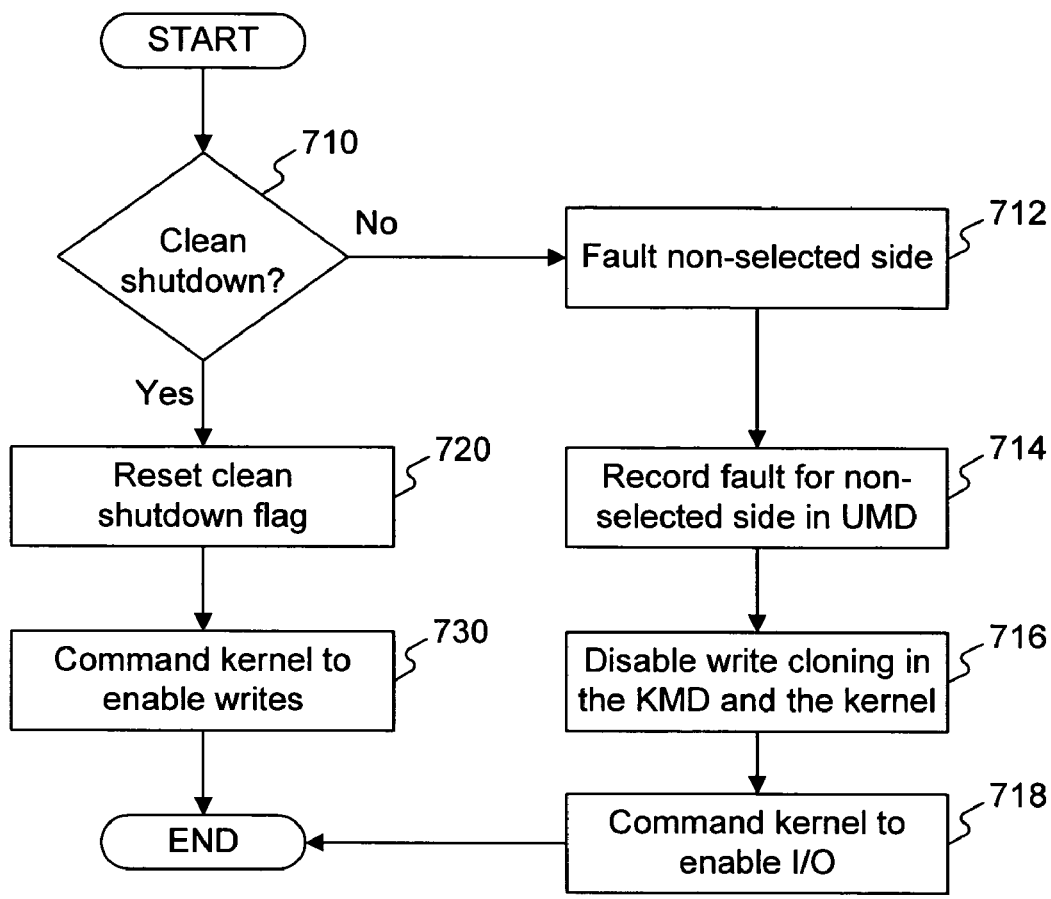
FIG. 7 is a flow diagram of an exemplary method in user space for maintaining data integrity after a host boot, consistent with an embodiment of the present invention.

FIG. 7 is a flow diagram of an exemplary method 700 in user space 305 for maintaining data integrity after a host boot, consistent with an embodiment of the present invention. In step 710, PPME_API 320 determines whether the prior shutdown of host 120 was a clean shutdown. If so, the process proceeds to step 720. If not, the process proceeds to step 712.

In step 712, when the prior shutdown was not a clean shutdown, the non-selected side of each migration currently using write cloning is faulted. Next, in step 714, a fault is recorded for the non-selected side in user metadata 330. In step 716, write cloning is disabled in kernel metadata 370 and in DM extension 390. When multiple migrations are underway, steps 712-716 are performed for each migration. Next, in step 718, a command is sent to the kernel 395 (e.g., DM extension 390) to enable I/O and the process ends.

In step 720, when the prior shutdown was a clean shutdown, a clean shutdown flag stored in kernel metadata 370 is reset. Next, in step 730, PPME_API 320 commands DM extension 390 to enable writes and the process ends.

Figure 8:
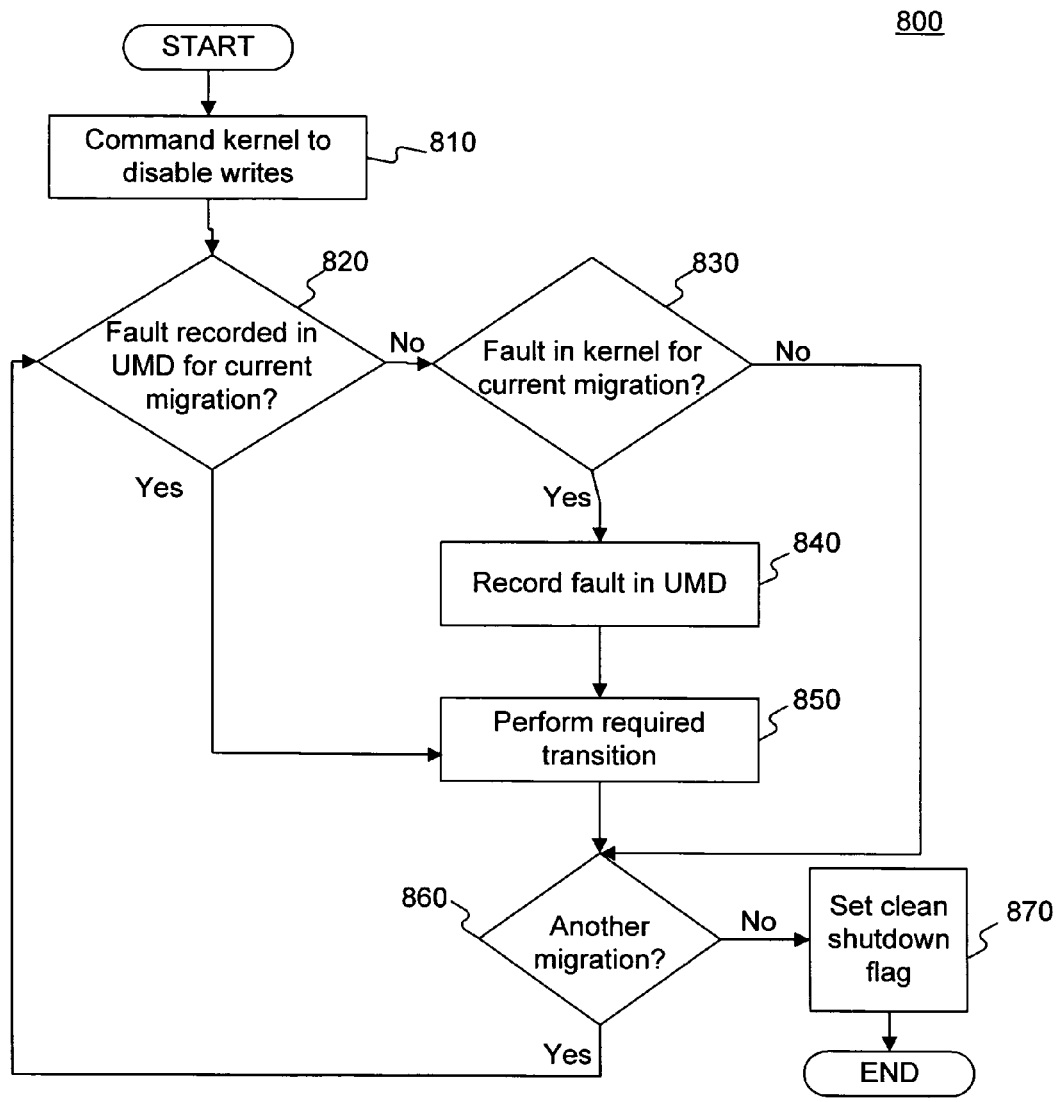
FIG. 8 is a flow diagram of an exemplary method for performing a clean shutdown in user space, consistent with an embodiment of the present invention.

FIG. 8 is a flow diagram of an exemplary method 800 for performing a clean shutdown in user space 305, consistent with an embodiment of the present invention. In step 810 of method 800, PPME_API 320 commands kernel 395 (i.e., DM extension 390) to disable writes to source device 130 and target device 140. Next, in step 820, PPME_API 320 checks for a fault that has occurred during the migration involving source device 130 and target device 140, which is recorded in user metadata 330. If a fault is recorded in user metadata 330, then the process proceeds to step 850. If a fault is not recorded in user metadata 330, then the process proceeds to step 830.

In step 830, it is determined whether DM extension 390 has recorded a fault for this migration. If a fault has been recorded, then the process proceeds to step 840. If fault has not been recorded, then the process proceeds to step 860.

In step 840, when a fault was detected, the fault is recorded in user metadata 330.

In step 850, a required transition is performed based on the recorded fault, as shown above in Table 2. Next, in step 860, PPME_API 320 determines whether there is another migration. If so, the process returns to step 820 and follows the same steps for each migration found in user metadata 330. Otherwise, the process proceeds to step 870.

In step 870, a clean shutdown flag is set in kernel metadata 370 indicating that clean shutdown processing was performed and the process ends.

One of ordinary skill in the art will appreciate that other variations of the above-described processes are in keeping with the spirit and scope of the present invention. For example, in a situation in which host 120 crashes in a source selected state and then reboots at the direction of boot device 110, target device 140 will be faulted and the user will be required to remain in the source selected state until the migration has been aborted. However, in an another embodiment, when host 120 reboots, host 120 may optionally attempt to write to target device 140 to determine whether the assumption that the target had failed was correct. If a write to target device 140 fails, then host 120 may conclude that the assumption was correct. In yet other implementations, after a fault has occurred, the user may optionally decide whether or not it is necessary to abort the migration. That is, instead of being required to abort the migration as discussed above, the user may have the option to "pause" the migration in order to remedy the fault and subsequently restart the migration. In other embodiments, when an input/output error occurs, irrespective of the device on which the error occurred, the unselected device may be faulted. According to yet another embodiment, after a fault, a user may decide which side of a migration to fault. According to still yet another embodiment, kernel metadata may be writable by the kernel.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

Moreover, while illustrative embodiments of the invention have been described herein, the scope of the invention includes any and all embodiments having equivalent elements, modifications, omissions, combinations, adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for maintaining integrity of application data in the event of device write failures during a non disruptive migration, comprising:
    cloning, by a filter driver in a kernel, an application write to both a source storage device and a target storage device;
    detecting whether the cloned application write to the source storage device or the cloned application write to target storage device failed; and
    when the cloned application write to the source storage device or the cloned application write to target storage device failed, allowing application reads from only one of the source storage device and the target storage device thereafter, wherein the migration begins from an initial state and transitions through intermediate states to a final state, and wherein a transition from any state other than the final state or a committed state is configured to transition towards one of the final state and a setup state based on one of user selections, validations and write failures.

2. The method of claim 1, wherein a chosen side of the migration corresponds to one of the source storage device or the target storage device from which reads are allowed and a non-chosen side corresponds to a side of the migration from which reads are not allowed, the method further comprising:

preventing transitions to one or more states of the migration in which application reads are performed by the non-chosen side using a data migration extension of the kernel.

3. The method of claim 2, wherein when the migration is in a first state in which application reads are performed by the non-chosen side, the method further comprising:

suspending or failing application reads and writes until a transition is performed to a second state in which application reads are performed by the chosen side.

4. The method of claim 2, wherein when the migration is in a syncing state and the cloned application write to the source storage device failed, allowing a transition to a setup state.

5. The method of claim 2, wherein when the migration is in a syncing state and the cloned application write to the target storage device failed, allowing a transition to a setup state.

6. The method of claim 3, wherein when the migration is in a source selected state and the cloned application write to the source storage device failed, allowing a transition to a target selected state.

7. The method of claim 2, wherein when the migration is in a source selected state and the cloned application write to the target storage device failed, allowing a transition to a setup state.

8. The method of claim 2, wherein when the migration is in a target selected state and the cloned application write to the source storage device failed, allowing a transition to a committed state.

9. The method of claim 3, wherein when the migration is in a target selected state and the cloned application write to the target storage device failed, allowing a transition to a setup state.

10. The method of claim 2, wherein when the migration is in a source selected state and the cloned application write to the source storage device failed, allowing a transition to a setup state.

11. The method of claim 2, wherein when the migration is in a target selected state and the cloned application write to the target storage device failed, allowing a transition to a committed state.

* * * * *

UNITED STATES PATENT AND TRADEMARK OFFICE
CERTIFICATE OF CORRECTION

PATENT NO. : 7,770,053 B1
APPLICATION NO. : 11/607067
DATED : August 3, 2010
INVENTOR(S) : Michael E. Bappe, et al.

Page 1 of 1

It is certified that error appears in the above-identified patent and that said Letters Patent is hereby corrected as shown below:

On the Title Page, item (75) delete "Micheal E. Bappe" and replace with --Michael E. Bappe--.

Signed and Sealed this
Eleventh Day of March, 2014

Michelle K. Lee
*Deputy Director of the United States Patent and Trademark Office*